US011498557B2

(12) United States Patent
 Knoller

(10) Patent No.: US 11,498,557 B2
(45) Date of Patent: Nov. 15, 2022

(54) LONGITUDINALLY GUIDING DRIVER ASSISTANCE SYSTEM IN A MOTOR VEHICLE

(71) Applicant: Bayerische Motoren Werke Aktiengesellschaft, Munich (DE)

(72) Inventor: Stefan Knoller, Munich (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 705 days.

(21) Appl. No.: 15/204,055

(22) Filed: Jul. 7, 2016

(65) Prior Publication Data

US 2017/0015319 A1 Jan. 19, 2017

(30) Foreign Application Priority Data

Jul. 14, 2015 (DE) ...................... 10 2015 213 181.5

(51) Int. Cl.
 *B60W 30/14* (2006.01)
 *B60W 30/18* (2012.01)
 (Continued)

(52) U.S. Cl.
 CPC .... *B60W 30/146* (2013.01); *B60W 30/18145* (2013.01); *B60W 30/18154* (2013.01);
 (Continued)

(58) Field of Classification Search
 CPC ...................... B60W 30/146; B60W 30/18145
 (Continued)

(56) References Cited

U.S. PATENT DOCUMENTS 8,751,133 B2  6/2014 Poulin
8,849,494 B1* 9/2014 Herbach ........... B60W 60/0015
                                                701/24
(Continued)

FOREIGN PATENT DOCUMENTS

CN    102334151 A    1/2012
CN    102795224 A    11/2012
(Continued)

OTHER PUBLICATIONS

Machine translation of Kitahama.*
(Continued)

*Primary Examiner* — Jean Paul Cass
(74) *Attorney, Agent, or Firm* — Crowell & Moring LLP

(57) ABSTRACT

A longitudinally guiding driver assistance system in a motor vehicle has a first detection system for detecting currently applying events or relevant events lying ahead, which require a change of the permissible maximum speed, a second detection system for detecting the course of the route, and a function unit which, when detecting a relevant event while taking into account the location of the relevant event, determines a location-dependent point in time, whose reaching causes the function unit to initiate an automatic adaptation of the currently permissible maximum speed or an output of a prompt information for permitting an automatic adaptation of the currently permissible maximum speed to anew permissible maximum speed. The function unit is designed to take into account available information concerning the course of the route when determining the location-dependent point in time.

10 Claims, 3 Drawing Sheets

(51) Int. Cl.
*B60W 50/10* (2012.01)
*B60W 50/14* (2020.01)
*B60W 50/00* (2006.01)

(52) U.S. Cl.
CPC ........ *B60W 50/0097* (2013.01); *B60W 50/10* (2013.01); *B60W 50/14* (2013.01); *B60W 2420/42* (2013.01); *B60W 2552/30* (2020.02); *B60W 2555/60* (2020.02); *B60W 2556/50* (2020.02); *B60W 2720/106* (2013.01)

(58) Field of Classification Search
USPC .......................................................... 701/70
See application file for complete search history.

(56) References Cited

U.S. PATENT DOCUMENTS

| | | | |
|---|---|---|---|
| 8,996,224 B1* | 3/2015 | Herbach | G05D 1/0044 |
| | | | 701/23 |
| 9,008,890 B1* | 4/2015 | Herbach | G05D 1/0214 |
| | | | 701/26 |
| 9,014,904 B2* | 4/2015 | Higgins-Luthman | |
| | | | G06K 9/00805 |
| | | | 701/28 |
| 9,507,346 B1* | 11/2016 | Levinson | G05D 1/0291 |
| 9,658,620 B1* | 5/2017 | Urmson | G06Q 30/0207 |
| 9,663,117 B2* | 5/2017 | Cullinane | B60K 35/00 |
| 9,671,784 B1* | 6/2017 | Dolgov | G05D 1/0287 |
| 9,682,704 B2* | 6/2017 | Teller | B60W 30/08 |
| 9,709,679 B1* | 7/2017 | Urmson | G01C 21/3826 |
| 9,760,092 B2* | 9/2017 | Ferguson | G05D 1/0214 |
| 9,766,626 B1* | 9/2017 | Zhu | G05D 1/0248 |
| 9,783,172 B2* | 10/2017 | Lombrozo | B60T 8/885 |
| 9,937,923 B2 | 4/2018 | Custer et al. | |
| 9,940,528 B2* | 4/2018 | Higgins-Luthman | |
| | | | B60Q 9/008 |
| 9,956,877 B2 | 5/2018 | Nakade | |
| 9,977,430 B2* | 5/2018 | Shalev-Shwartz | |
| | | | B60W 30/0953 |
| 2002/0022920 A1 | 2/2002 | Straub | |
| 2004/0193374 A1* | 9/2004 | Hac | B60W 10/06 |
| | | | 701/301 |
| 2006/0100769 A1 | 5/2006 | Arai et al. | |
| 2006/0184297 A1* | 8/2006 | Higgins-Luthman | |
| | | | B60W 40/04 |
| | | | 701/41 |
| 2007/0050130 A1 | 3/2007 | Grimm et al. | |
| 2008/0255746 A1 | 10/2008 | Hellmann et al. | |
| 2010/0217494 A1 | 8/2010 | Heft et al. | |
| 2011/0112740 A1 | 5/2011 | Hashimoto | |
| 2012/0215416 A1 | 8/2012 | Poulin | |
| 2012/0253628 A1 | 10/2012 | Maruyama | |
| 2012/0316746 A1 | 12/2012 | Park | |
| 2013/0219294 A1* | 8/2013 | Goldman-Shenhar | |
| | | | G06F 3/0484 |
| | | | 715/751 |
| 2014/0200788 A1 | 7/2014 | Eriksson et al. | |
| 2014/0309864 A1* | 10/2014 | Ricci | G05D 23/1917 |
| | | | 701/36 |
| 2014/0330456 A1* | 11/2014 | Lopez Morales | G05D 1/0022 |
| | | | 701/3 |
| 2015/0105993 A1 | 4/2015 | Um et al. | |
| 2015/0112526 A1* | 4/2015 | Martin | B60W 20/12 |
| | | | 701/22 |
| 2015/0149059 A1 | 5/2015 | Choi | |
| 2015/0192660 A1 | 7/2015 | Dickow et al. | |
| 2015/0339928 A1* | 11/2015 | Ramanujam | G06Q 50/30 |
| | | | 701/23 |
| 2016/0082960 A1 | 3/2016 | Slaton et al. | |
| 2016/0125735 A1* | 5/2016 | Tuukkanen | G08G 1/202 |
| | | | 701/23 |
| 2016/0214608 A1 | 7/2016 | Packwood-Ace | |
| 2016/0264021 A1* | 9/2016 | Gillett | H04M 1/7253 |
| 2017/0076201 A1* | 3/2017 | van Hasselt | G06N 3/08 |
| 2017/0088038 A1* | 3/2017 | Geller | B60Q 1/50 |
| 2017/0151958 A1* | 6/2017 | Sakuma | G01C 21/3664 |
| 2018/0032082 A1* | 2/2018 | Shalev-Shwartz | G06N 3/006 |
| 2018/0345948 A1 | 12/2018 | Ulrich et al. | |

FOREIGN PATENT DOCUMENTS

| | | | |
|---|---|---|---|
| CN | 104507780 A | 4/2015 | |
| DE | 10 2004 042 382 A1 | 3/2006 | |
| DE | 10 2007 005 245 A1 | 11/2007 | |
| DE | 10 2008 018 421 A1 | 9/2009 | |
| DE | 10 2010 054 241 A1 | 6/2012 | |
| DE | 11 2010 001 354 T5 | 8/2012 | |
| DE | 10 2012 102 564 A1 | 10/2012 | |
| DE | 10 2012 010 865 A1 | 12/2012 | |
| DE | 10 2012 211 967 A1 | 1/2014 | |
| DE | 10 2012 213 229 A1 | 1/2014 | |
| DE | 10 2012 016 941 A1 | 2/2014 | |
| DE | 10 2013 205 609 A1 | 10/2014 | |
| DE | 10 2013 209 064 A1 | 11/2014 | |
| DE | 10 2014 017 522 A1 | 6/2015 | |
| DE | 10 2014 215 673 A1 | 2/2016 | |
| EP | 2 020 331 A1 | 2/2009 | |
| EP | 2 883 770 A3 | 6/2015 | |
| JP | 2010198578 A * | 9/2010 | ............ G01C 21/34 |
| JP | 2012-206594 A | 10/2012 | |
| JP | 2015-79369 A | 4/2015 | |

OTHER PUBLICATIONS

German Office Action issued in counterpart German Application No. 10 2015 213 181.5 dated Feb. 23, 2016 (seven pages).
Chinese Office Action issued in Chinese application No. 201610509490.7 dated Apr. 7, 2020, with English translation (Fourteen (14) pages).
Chinese Office Action issued in Chinese application No. 201610507131.8 dated May 9, 2020, with English translation (Twenty One (21) pages).
Chinese Office Action issued in Chinese application No. 201610509490.7 dated Dec. 21, 2020, with English translation (Thirteen (13) pages).

* cited by examiner

LONGITUDINALLY GUIDING DRIVER ASSISTANCE SYSTEM IN A MOTOR VEHICLE

CROSS REFERENCE TO RELATED APPLICATIONS

This application claims priority under 35 U.S.C. § 119 from German Patent Application No. 10 2015 213 181.5, filed Jul. 14, 2015, the entire disclosures of which are herein expressly incorporated by reference.

This application contains subject matter related to U.S. application Ser. No. 15/204,078, entitled "Longitudinally Guiding Driver Assistance System in a Motor Vehicle" filed on even date herewith.

BACKGROUND AND SUMMARY OF THE INVENTION

The invention relates to a longitudinally guiding driver assistance system in a motor vehicle.

Basically many longitudinally guiding driver assistance systems further developed as speed control systems are already known which automatically control the speed of the motor vehicle to a predefined desired or maximally permissible speed. In addition to these longitudinally controlling systems, currently longitudinally controlling systems expanded by a ranging control—so-called spacing-related longitudinally controlling systems or speed control systems—can already be purchased from some manufacturers. Such systems—offered, for example, by the applicant of the present patent application under the name "Active Cruise Control"—, make it possible to automatically guide the motor vehicle while maintaining a desired distance from the vehicle driving ahead at a desired or a correspondingly lower speed. When a distance sensing system mounted at the motor vehicle, which may operate particularly on a radar basis, detects in its own lane a target object or (motor) vehicle driving ahead, its own speed will be adapted—for example, by causing a suitable braking torque—to the speed of the motor vehicle driving ahead or of the target object, such that a distance control contained in the "active cruise control" or in the corresponding longitudinally controlling system automatically sets, depending on the situation, an appropriate distance from the motor vehicle driving ahead or the target object, and maintains this distance.

Furthermore, longitudinally guiding driver assistance systems further developed as so-called speed limiting systems are known, which prevent an exceeding of the permissible maximum speed set by the driver.

German Patent document DE 10 2012 211 967 A1 describes a combination of a speed limiting system and a speed control system, in which case, the permissible maximum speed of the speed limiting system can be applied, instead of the adjusted set speed, as the (new) desired or target speed for the speed control.

Finally, in newer vehicles, there are also driver assistance systems which detect, either from map data of a navigation system and/or by way of image processing, in an anticipatory manner a speed limitation, and are capable of constantly, as soon as a speed limit has been reached, indicating the latter to the driver, so that, independently and as required, the driver can adapt his speed to the speed limit (for example, BMW Speed Limit Info).

From German Patent document DE 10 2008 018 421 A1, a driver assistance system is known for sending and receiving speed data and/or traffic density data for controlling a speed control system, which, by means of the received data, determines a permissible maximum speed and reports the latter to the driver by the output of corresponding information. The driver can apply this target of the permissible speed by a simple activation to his speed control system.

From the still unpublished German Patent Application DE 10 2014 215 673 A1, a longitudinally guiding driver assistance system is also known which, when an imminent event is detected that requires a speed reduction, determines a deceleration strategy and, at a defined point in time before the event has been reached, outputs prompt information to the driver for permitting the automatic implementation of the deceleration strategy. When the driver acknowledges the prompt information, an automatic implementation of the deceleration strategy is caused. The detection unit can detect or recognize a relevant event either on the basis of map data (for example, of a navigation device) or on the basis of camera data.

It is now an object of the invention to provide an improved longitudinally guiding driver assistance system with an adaptation of the speed to a new permissible maximum speed, which adaptation the driver and/or the rear traffic can comprehend and which is therefore not unexpected.

This and other objects are achieved by a driver assistance system for a motor vehicle according to the invention having essentially a detection system for detecting currently applying or relevant events lying ahead, which require a change of the permissible maximum speed, a second detection system, which may be part of the first detection system or may be identical with the latter, for detecting the course of the route to be traveled, and a function unit which determines a location-dependent point in time when detecting a relevant currently applying event or an event lying ahead, while taking into account the location of the relevant event (and, as required, additional necessary information, such as a determined maximally permissible speed at the location of the relevant event, the differential speed between the vehicle and a determined new maximally permissible speed, a detected clear travel or following travel, current or permitted type of deceleration modes of the vehicle, for example, a sailing mode, coasting mode, braking mode). With the reaching of this point in time, the function unit causes an automatic adaptation of the currently permissible maximum speed or an output of prompt information for permitting an automatic adaptation of the currently permissible maximum speed to a new permissible maximum speed. When an event lying ahead is detected in time, ideally a deceleration strategy of the vehicle is determined for reaching the determined permissible maximum speed (at least approximately) at the location of the relevant event. By means of the determined deceleration strategy, the location-dependent point in time to be determined will then be obtained, at which the automatic adaptation of the currently permissible maximum speed or the output of prompt information will be initiated for permitting an automatic adaptation of the currently permissible maximum speed to a new permissible maximum speed.

When, in the case of an output of prompt information, a permission acknowledgment triggered (manually)—for example, by actuating an operating element—is detected, or an automatic adaptation of the permissible maximum speed is directly initiated, during the adaptation of the permissible maximum speed (at least in the case of a clear travel), an activation of the driving and/or braking actuator system is initiated while taking into account the new permissible maximum speed by outputting a corresponding desired acceleration value, so that the vehicle speed, at least during clear travel and a higher m tally predefined permissible desired speed, is controlled to the new permissible maximum speed.

Events lying ahead may, for example, be temporary or permanent speed limitations, which are either indicated directly on traffic signs or can be derived therefrom according to the general traffic rules Un Germany, for example, the speed limit for driving through built-up areas is 50 km/h). Likewise, the event may also be one that terminates the speed limitation or at least increases it to anew maximum speed, which usually occurs, for example, when leaving a built-up area.

The (new) permissible maximum speed relevant to the longitudinally guiding driver assistance system at the location of the event lying ahead may either b the actually predefined new speed limit or a speed that deviates from the predefined new speed limit by a predefined amount in the upward or downward direction. In this case, the amount and the direction of the deviation may, for example, also be adjustable by the driver in a central vehicle menu. This new maximum speed can be transmitted directly to the function unit, or can only be determined in the function unit on the basis of the available information.

As an alternative or in addition, it is also contemplated that, on a route known to the driver, the driver himself defines speed limits according to the location by way of an interface inside or outside the vehicle. When traveling the route with the active longitudinally guiding system, these speed limits can correspondingly be taken into account as new maximum speeds. In this case, the driver can, for example, in advance also select whether he wants to always have all self-defined speed limits taken into account, or only speed limits selected corresponding to a rule (for example, on a certain route, for defined route categories, at a defined time of day, as a function of weather conditions, etc.) Several speed profiles may also be created for a defined route section, which will then be active corresponding to predefined rules (speed profile for good route conditions, speed profile for wet routes and/or speed profile for snow-covered routes).

The function unit can further be set up to initiate a retraction of the output of a prompt information when a permission acknowledgment is recognized. When a (manually) triggered refusal of the prompt information is detected, the output of the prompt information is also retracted.

The invention is based on the following recognition: In the case of defined route courses, it is possible that speed limit signs may be located partially in front of tight turns, traffic circles or on expressways in front of or in an exit. When, for example, a traffic sign is recognized which changes the permissible maximum speed, and the change of the permissible maximum speed is permitted, or an automatic change of the permissible maximum speed is automatically initiated (without any permission acknowledgment) on the basis of a detected event, the driver may, under certain circumstances, experience awkward situations. For example, in the case of an adaptation of the permissible maximum speed, which leads to an acceleration of the vehicle, this may be awkward or inexplicable to the driver if, in the further course of the route, there is a traffic circle or a tight turn, which should be traveled at a lower speed for reasons of comfort and safety. Furthermore, impairments of the rear traffic may occur, if an adaptation of the permissible maximum speed is initiated because of a detected relative event situated ahead, which would lead to a (slow) deceleration of the vehicle because the driver wants to leave the road, for example, at the next exit.

In order to prevent that such accelerations or decelerations of the vehicle are initiated, which are inopportune for the driver or the rear traffic, it is provided according to the invention that the function unit is further configured for taking into account further available information concerning the course of the route when determining the location-dependent point in time (when detecting a relevant event that requires a change of the permissible maximum speed). When the function unit is constructed such that, in the case of an event lying ahead, it first determines a deceleration strategy, so that the determined new maximally permissible speed is reached at the location of the event lying ahead, and (normally) the location-dependent point in time is derived therefrom, under corresponding conditions, the location-dependent point in time derived therefrom can be changed or adapted while taking into account relevant information concerning the course of the route, and can thereby be used as a relevant point in time for the adaptation of the permissible maximum speed that is to be initiated manually or automatically.

In an advantageous further development, the function unit is designed for taking into account, for the determination of the location-dependent point in time, available information concerning the currently traveled course of the route and/or a course of the route lying ahead, particularly lying ahead behind the detected relevant event. The taking into account of the actual course of the route is particularly advantageous it for example, when activating the longitudinally guiding driver assistance system, because of a past but currently still valid relevant event which requires an adaptation or definition of the permissible maximum speed, an (after a permission) automatic adaptation of the permissible maximum speed would have to be initiated, but the current route section is in conflict with the new permissible maximum speed. In the case of an active longitudinally guiding driver assistance system, particularly the course of the route lying ahead behind the detected relevant event, especially the route section situated within a route interval starting at the location of the relevant event, is relevant because, in the case of a (premature) adaptation of the permissible maximum speed, an acceleration behavior of the vehicle could be caused that is undesired by the driver.

In order to prevent by use of the invention an undesired acceleration behavior as a result of an adaptation of the permissible maximum speed initiated at the wrong point in time, particularly that information of the considered relevant course of the route should be taken into account which could have an influence on the longitudinal guidance of the vehicle.

According to an advantageous further development of the longitudinally guiding driver assistance system, the second detection system and/or the function unit may be designed for determining information concerning a maximally recommended speed of a relevant route section of the course of the route to be considered. Either predefined routings, which the driver will probably travel, or individual route sections can be defined as relevant route sections. In terms of predefined relevant routings, a recommended maximum speed can, for example, be determined for traffic circles, turnoffs and/or tight turns, if such a relevant routing is traveled currently or in the future. For this purpose, for example, in the case of a detected traffic circle, a recommended maximum speed applicable to each traffic circle or a recommended maximum speed dependent on the radius of the traffic circle can be determined. When, on the basis of such a relevant routing, a recommended maximum speed is determined, the function unit can, when determining the location-dependent point in time at which the driver is to be prompted to adapt the permissible maximum speed or at which an automatic adaptation of the permissible maximum speed is to be directly initiated, take this recommended maximum speed into account as information concerning the course of the route.

Advantageously, the function unit is further designed for taking into account during the determination of the location-dependent point in time available information concerning the course of the route, particularly if the detected relevant event leads to an adaptation of the permissible maximum speed such that, in the case of an adaptation of the permissible maximum speed, an acceleration of the motor vehicle would be initiated (i.e. as a result of an increase of the permissible speed, the driving actuator system would be caused to accelerate the vehicle or permit a requested acceleration). If an adaptation of the permissible maximum speed would result in an acceleration of the vehicle, during the determination of the location-dependent point in time, the available information concerning the course of the route can be taken into account such that the determination of the location-dependent point in time will in turn be influenced only if as information concerning the course of the route, a recommended maximum speed for a relevant route section is determined which, when observed, would counteract an acceleration of the vehicle. In other words, the function unit may advantageously be designed to determine, in the case of a detected event that, when an adaptation of the permissible maximum speed is carried out, would lead to an acceleration of the vehicle, the location-dependent point in time as a function of a recommended maximum speed of a route section of the course of the route lying behind the detected event.

If this is so, the function unit may advantageously be designed so that, in the case of a detected relevant event which, in the case of an adaptation of the permissible maximum speed, would lead to an acceleration of the vehicle, and in the case of a detected route section which provides a lower recommended maximum speed than the permissible maximum speed determined on the basis of the relevant event, the function unit determines the location-dependent point in time such that the automatic adaptation or the output of the prompt information for permitting the automatic adaptation of the permissible maximum speed is initiated only after the passing through the detected route section with the lower recommended maximum speed. In particular, the location-dependent point in time can then only be determined such that the automatic adaptation or the output of the prompt information is initiated only after the passing through the detected route section at a lower recommended maximum speed when the relevant event lies in front of or within the detected route section with a lower recommended maximum speed.

In a further embodiment, it may be provided, in addition or as an alternative, that the function unit is designed so that, during the determination of the location-dependent point in time, it (also) takes into account available information concerning a course of the route which lies ahead, particularly which lies ahead of a detected relevant event.

In the case of an active longitudinally guiding driver assistance system, the course of the route lying ahead of the detected relevant event will be relevant because, in the case of a (premature) adaptation of the permissible maximum speed, particularly for the rear traffic, an undesired acceleration behavior (mainly during a deceleration) of the vehicle could be initiated.

In order to prevent, by use of the invention, an undesired (negative) acceleration behavior as a result of an adaptation of the permissible maximum speed initiated at an adverse point in time, mainly that information of the considered relevant course of the route that could have an influence on the longitudinal guidance of the vehicle should be taken into account. In particular, the function unit may be designed for taking into account, during the determination of the location-dependent point in time, available information concerning a route turnoff lying ahead in front of the location of the relevant event, into which route turnoff the motor vehicle will probably drive.

In a particularly advantageous further development, the function unit may be concretely designed for taking into account, during the determination of the location-dependent point in time, available information concerning the angle between the currently traveled route section and a route turnoff situated in the course of the route lying ahead, into which route turnoff the motor vehicle will probably drive. A taking into account of this information can take place particularly if the route turnoff situated in the course of the routing lying ahead is situated before a detected relevant event that requires an adaptation of the permissible maximum speed.

According to a further advantageous embodiment of a correspondingly designed longitudinally guiding driver assistance system according to the invention, the second detection system and/or the function unit may be designed for determining an between a currently traveled route section and a route turnoff situated in a route section lying ahead, into which turnoff the motor vehicle will probably drive. This determined angle can then be taken into account as information concerning the course of the route when determining the location-dependent point in time at which the driver should be prompted to adapt the permissible maximum speed, or at which an automatic adaptation of the permissible maximum speed should be directly initiated.

Advantageously, the function unit is further designed for taking into account, during the determination of the location-dependent point in time, available information concerning the angle between the currently traveled route section and a route turnoff situated in the route section lying ahead, into which turnoff the motor vehicle will probably drive, particularly, if the detected relevant event (situated behind the route turnoff) leads to an adaptation of the permissible maximum speed such that, when the permissible maximum speed is adapted, a deceleration of the motor vehicle would be initiated, particularly a deceleration that is lower than a predefined deceleration limit (i.e., because of a reduction of the permissible maximum speed, the driving and/or braking actuator system would be caused to decelerate the vehicle). Advantageously, the function unit could therefore be designed for determining, in the case of a detected event lying ahead, whose location is behind a route turnoff into which the vehicle will probably drive, and which, during an adaptation of the permissible maximum speed, would result in a (slight) deceleration, the location-dependent point in time as a function of the angle between the currently traveled route section and the relevant route turnoff lying ahead.

The determined angle can therefore be taken into account as follows: When the determined relevant event is situated behind a route turnoff into which the driver will probably drive, in the case of a determined angle between the currently traveled route section and the route turnoff, which is smaller than a predefined limit value (for example, smaller than 110°), the location-dependent point in time is detected such that the automatic adaptation of the permissible maximum speed or the output of the prompt information for permitting an adaptation of the permissible maximum speed is, in each case, initiated only after passing through the route turnoff. Such a "shifting" of the output of the prompt information or the automatic adaptation of the permissible maximum speed is advantageous mainly because it is thereby ensured that, on the one hand, no acceleration of the vehicle is caused before a turnoff situation and, on the other hand, no prematurely initiated deceleration of the vehicle takes place by which the rear traffic could be hindered. Since, as a rule, an acceleration of the vehicle should always be prevented before a turnoff situation, advantageously such a determination of the location-dependent point in time can also only take place when under otherwise equal conditions, the adaptation of the maximum speed would lead to a deceleration of the vehicle (i.e. the determined new permissible maximum speed is lower than the currently permissible maximum speed or the current vehicle speed).

However, if an angle between a currently traveled route section and a route turnoff is determined that is not smaller than a predefined limit value (for example, greater than 110°), the location-dependent point in time is not determined such that an automatic adaptation of the permissible maximum speed or the output of the prompt information for permitting an adaptation of the permissible maximum speed is in every case initiated only after the passing through the route turnoff. On the contrary, in such a situation, the location-dependent point in time in the case of a correspondingly larger angle is determined as a function of the relative speed difference between the vehicle speed and the determined permissible maximum speed at the location of the detected relevant event and/or as a function of the route type of the currently travelled routes and/or of the routes to be traveled after the route turnoff.

If, for example, on the basis of the known road type, the information is available that the vehicle is currently on an expressway (for example, the Autobahn) and, because of the large speed difference between the current speed of the vehicle on the expressway and the determined permissible maximum speed after the exit from the expressway (because of the determined deceleration strategy), a deceleration of the vehicle on the Autobahn would be initiated very early, this would severely hinder the traffic that follows. In order to avoid this, in such a situation, the location-dependent point in time would be determined such that an automatic adaptation of the permissible maximum speed or the output of the prompt information for permitting an adaptation of the permissible maximum speed will be initiated only after the passing through the route turnoff. However, if under otherwise identical conditions, the relative speed is very low, an automatic adaptation of the permissible maximum speed or the output of the prompt information for permitting an adaptation of the permissible maximum speed can also be initiated earlier, thus also before passing through the route turnoff, because, as a result of the low relative speed, the automatically initiated or manually permitted deceleration of the vehicle would start only shortly before the route turnoff. In other words, as a result of a corresponding determination of the location-dependent point in time, the automatic adaptation of the permissible maximum speed or the output of the prompt information is only shifted toward the rear into the route turnoff, if, in the case of "normal" travel, thus without taking into account the male of the route turnoff, the point in time of the automatic adaptation or the output of the prompt information would have to be initiated very far before the route turnoff.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
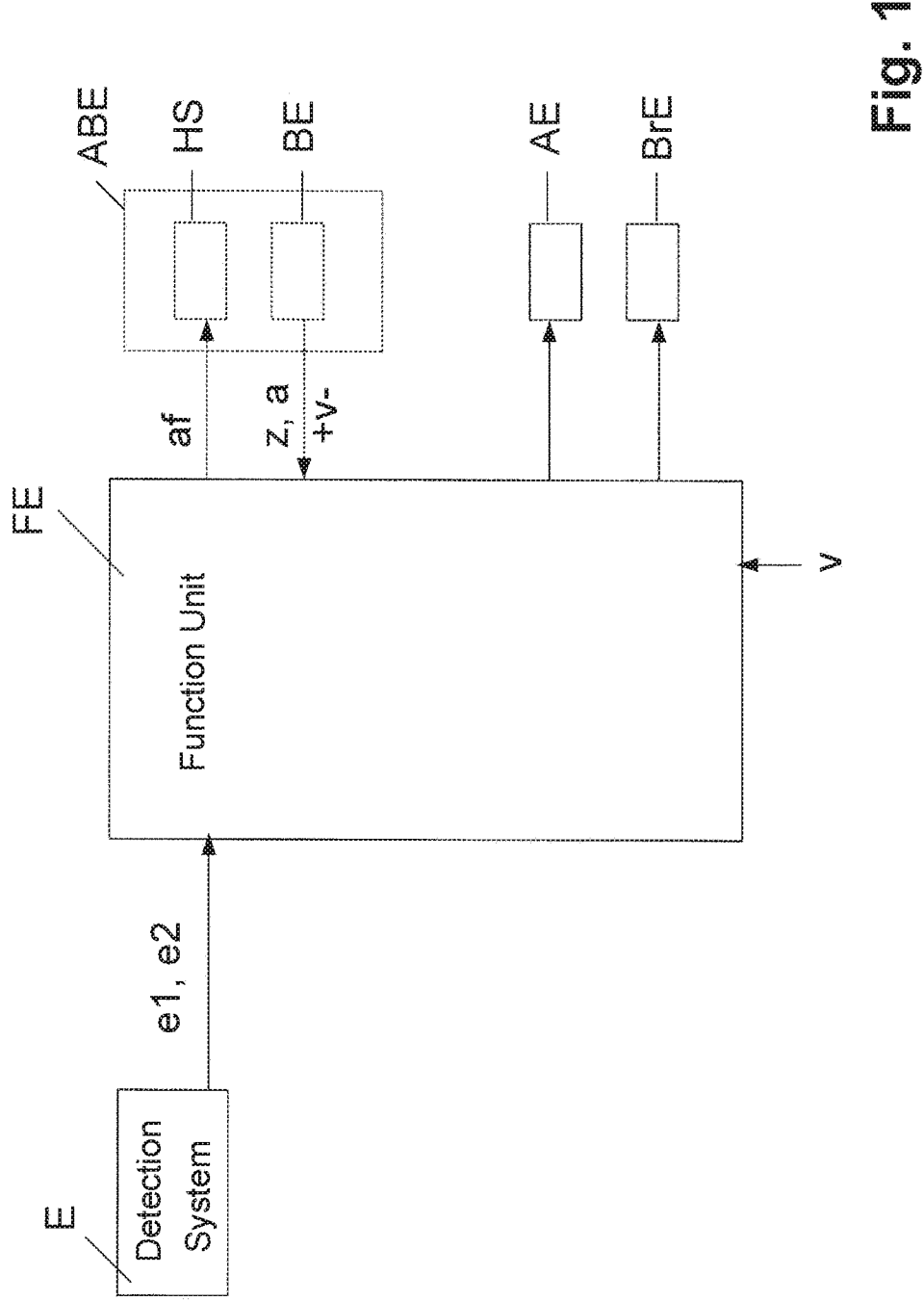
FIG. 1 is a schematic diagram of an examplary construction of a longitudinally guiding driver assistance system designed as a speed control system in a motor vehicle, for controlling the speed to a desired speed.

FIG. 1 illustrates in detail, as a central element of a longitudinally guiding driver assistance system, a function unit FE. The function unit FE may be a microprocessor based function unit that carriers out its functionality. The function unit FE receives input signals e1, and e2 of a detection system E, a speed signal v, a permission signal z for permitting an automatic adaptation of the permissible maximum speed, a rejection signal a for rejecting the permission of the automatic adaptation of the permissible maximum speed, and a signal +v– for the manual adaptation of the permissible maximum speed.

The detection unit E is a map-based detection unit E which, by means of available map data, the own position and a known route section lying ahead, detects events that require an adaptation of the permissible maximum speed (such as the speed limit) or that permit it (such as the elimination of a speed limit). The map-based detection unit E is further developed such that, on the one hand, it detects the location of the relevant event lying ahead, thus also the amount of the maximally permitted limit speed applicable from this location, and transmits it to the function unit FE by the signal e1.

The map-based detection unit E further detects, by means of available map data—and, as required, while taking into account a planned driving route, available information e2 concerning the course of the route, such as traffic circles, tight turns and/or turnoffs.

Additionally, but not illustrated here, the function unit FE may be connected to a camera-based detection unit which, by means of the data of a forward-oriented sensor system (for example, a video sensor system), also detects speed-limiting events lying ahead, which may conceivably require an adaptation of the permissible maximum speed to a new maximum speed. In contrast to the map-based detection unit E, the camera-based detection unit can first detect the relevant locations on the basis of the sensor system only in an anticipatory fashion and only relatively quickly, or—because of the required signal processing—also only after the passing of the relevant event.

As soon as relevant data e1 concerning the location of a relevant event lying ahead, the amount of the limit speed maximally permitted starting from this location and conceivably relevant information e2 concerning the course of the route are available to the function unit FE, the function unit FE can first—taking into account a driver predefinition—determine the permissible maximum speed at the location of the event lying ahead. As an alternative, the transmitted maximally permitted limit speed can be used directly as the permissible maximum speed.

By means of available relevant data, such as the relative speed difference between the vehicle and the determined permissible maximum speed, the distance to the relevant location, the available relevant information e2 concerning the course of the route, particularly a determined recommended maximum speed, and/or a determined deceleration strategy, the function unit FE initiates at a defined point in time the output of a prompt signal by a corresponding signal af to a display operating unit ABE. The display operating unit ABE comprises an information system HS and an operating system BE. According to a further development of the speed control system, according to a first alternative, the output can basically be initiated only when the determined new permissible maximum speed is lower than the maximally desired speed predefined by the driver. According to a second alternative, the output can take place independently of the maximum speed desired by the driver.

The operating element BE, by which the driver can acknowledge the prompt information, is further developed such that at those times at which no prompt information is outputted, the driver can request a manual adaptation of the maximally desired speed +v. In addition, the operating element BE is further developed such that, during the output of the prompt information, by way of a first operating mode, the driver can acknowledge the requested permission of the automatic adaptation of the permissible maximum speed (signal z), or, by way of a second operating made, can reject the requested permission of the automatic adaptation of the permissible maximum speed (signal a).

Only when the driver acknowledges the prompt signal during the output of the prompt information by operating the operating element BE according to the first operating mode, will the display operating unit ABE send back a corresponding "permission" signal z to the function unit FE. The function unit FE then begins with the initiation of the automatic adaptation of the permissible maximum speed and—corresponding to the new maximum speed—with an adaptation of the speed control while taking into account the new permissible maximum speed by initiating a corresponding triggering of the drive unit AE and/or braking unit BrE. When the vehicle is, for example, in the so-called clear travel mode, a controlling of the speed takes place for reaching the new maximum speed at the location of the relevant event. When the vehicle is in the so-called following mode with respect to a target object driving ahead, the following-drive control while taking into account the new permissible maximum speed is continued (at first). Simultaneously, when the manually triggered permission acknowledgement z is detected, the retracting of the output of the prompt information is initiated.

When, during the output of the prompt information, the driver rejects the permission of the automatic adaptation of the permissible maximum speed by operating the operating element BE according to the second operating mode, the display operating unit will send a signal a back to the function unit. Subsequently, the function unit rejects the newly determined permissible maximum speed and continues the current speed control. Simultaneously, with the detection of the manually triggered rejection, the retraction of the output of the prompt information is initiated.

According to an alternative further development of the longitudinally guiding driver assistance system, the function unit FE could also be further developed such that it initiates the automatic adaptation of the permissible maximum speed, not until after the receipt of a permission acknowledgment z, but rather automatically when reaching the determined defined point in time. In the case of such a further development, the dotted display operating unit ABE would not be necessary.

With respect to the invention, the function unit FE is now designed for carrying out the determination of the defined point in time while taking into account the relevant information of the course of the route, particularly while taking into account a determined recommended maximum speed of relevant route sections. In a concrete further development, this could take place as follows: When the data e1 concerning a relevant event, which requires an adaptation of the permissible maximum speed, and information concerning the course of the route are transmitted to the function unit FE, the function unit FE will first determine the new permissible maximum speed and, for relevant route sections (such as tight turns, turnoffs, traffic circles, etc. which are within a defined route section that starts from the location of the relevant event) a recommended maximum speed. When the recommended maximum speed is lower than the determined (new) permissible maximum speed, the point in time, as of which the prompt information outputted or the automatic adaptation is initiated, is predefined such that the prompt information or the automatic adaptation of the permissible maximum speed is initiated only after passing through the relevant route section with the lower recommended maximum speed. It can thereby be ensured that the vehicle is at first not accelerated because of the adaptation of the permissible maximum speed and is then, within a short period of time, decelerated because of the lower recommended maximum speed.

As an alternative or in addition, the function unit may also be designed as follows: When a relevant event e1 is detected and this detected relevant event is situated behind a route turnoff into which the driver will probably drive, the angle between the currently traveled route section and the route turnoff is determined first and is compared with a limit value. When a determined angle between the currently traveled route section and the route turnoff is smaller than the predefined limit value, the location-dependent point in time is determined such that the output of the prompt information for permitting an adaptation of the permissible maximum speed or the automatic adaptation of the permissible maximum speed is in each case initiated only after passing through the route turnoff. However, when an angle is determined between a currently traveled route section and a route turnoff which is not smaller than a predefined limit value, the location-dependent point in time is determined as a function of the relative speed between the current vehicle speed v and the determined permissible maximum speed at the location of the detected relevant event and/or as a function of the route type of the currently traveled routes and/or of the routes to be traveled after the route turnoff.

Figure 2:
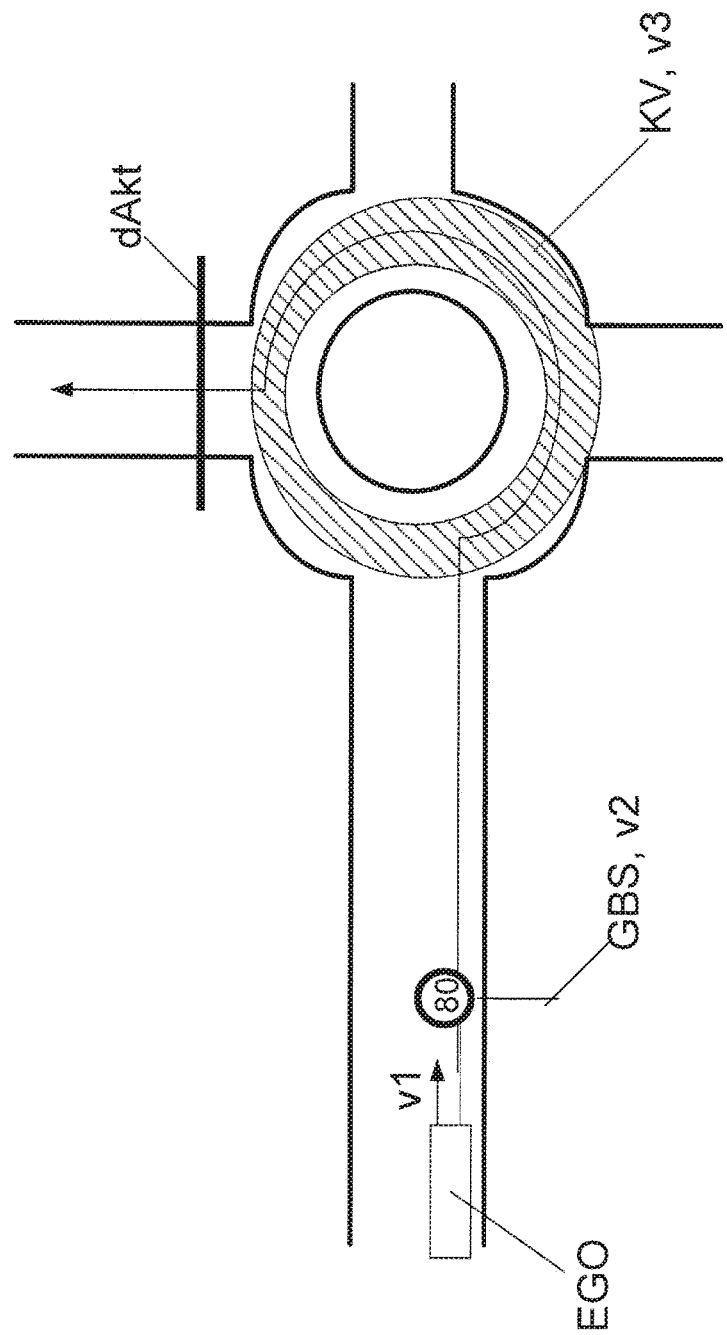
FIG. 2 is a view of a first traffic situation in which a further development of a longitudinally guiding driver assistance system according to the invention is advantageous.

FIG. 2 illustrates a traffic situation, in which a vehicle EGO equipped with a correspondingly further developed speed control system is moving toward a traffic circle KV as a result of the active cruise control at a speed v1 of for example, 50 km/h. By means of the activated route guidance, it is known that the vehicle will probably leave the traffic circle at the 3rd exit. A speed limit sign GBS is situated ahead of the traffic circle KV and indicates that, starting from this location, the permissible maximum speed v2 (in this example, amounts to 80 km/h. As a result of the radius of the traffic circle KV, the traffic circle KV should be traversed at a recommended speed v3 of maximally 50 km/h. In order to prevent that the vehicle EGO is not accelerated because of a (manually permitted or automatic) adaptation of the permissible maximum speed ahead of the traffic circle, and, as a result of the lower recommended maximum speed v3 then has to be decelerated again in the traffic circle KV, the prompt information or the automatic adaptation of the permissible maximum speed will be initiated only after driving through the traffic circle at the location dAkt.

Figure 3:
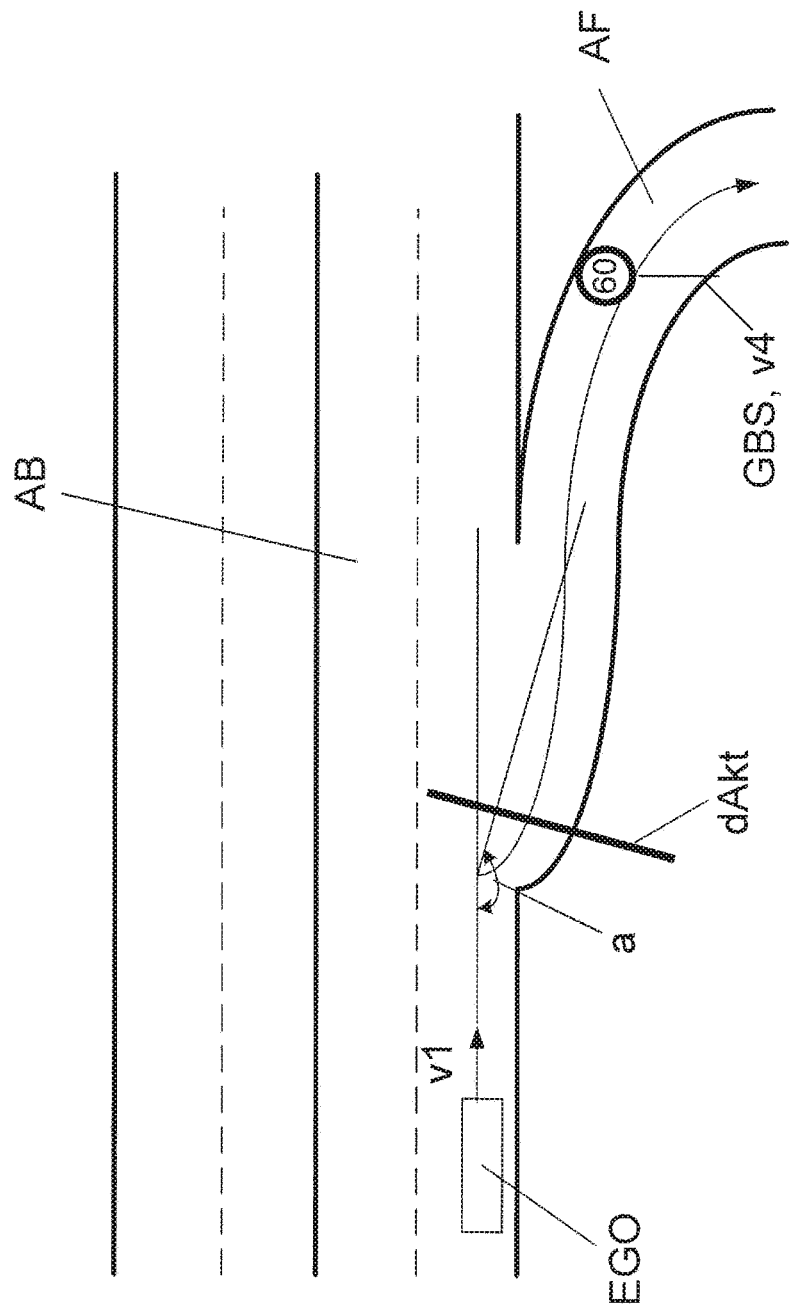
FIG. 3 is a view of a second traffic situation in which a further development of a longitudinally guiding driver assistance system according to the invention is advantageous.

FIG. 3 illustrates a traffic situation in which a vehicle EGO equipped with a correspondingly further developed speed control system is driving on an Autobahn AB at a speed v1 of for example, 120 km/h as a result of the active cruise control. Because of the activated route guidance, it is known that the vehicle will leave the Autobahn AB at the next exit AF. The angle a between the Autobahn AB and the exit AF amounts to approximately 160°. A speed limit sign GBS is situated in the exit AF and indicates that, starting from this location, the permissible maximum speed v4 amounts to 60 km/h. In order to prevent the vehicle EGO being decelerated already very early on the Autobahn AB and therefore also causing the rear traffic to decelerate, taking into account the elative speed between the speed v1 of the vehicle EGO and the maximally permissible speed v4 at the location of the detected relevant event GBS, the location-dependent point in time dAkt is determined such that the display of the prompt information or the automatic adaptation of the permissible maximum speed is initiated only shortly after driving into the exit AF. If the determined angle were smaller than a predefined limit value of, for example 110°, the location-dependent point in time would be determined independently of the relative speed and the road type such that the output of the prompt information or the automatic adaptation of the permissible maximum speed would in each case be initiated after passing through the turnoff.

For reasons of completeness, it should finally be mentioned that the longitudinally guiding driver assistance system can also be used for other types of assistance to the driver during the longitudinal guidance.

Thus, the longitudinally guiding driver assistance system may, for example, also be designed as a speed control system, in which a maximally permissible limit speed can be predefined, and the function unit is designed for preventing an exceeding of the predefined or set maximally permissible speed by a corresponding triggering of the drive. When an event is detected that leads to a change of the permissible maximum speed, the function unit may be designed for then, at a defined point in time before reaching the event lying ahead (thus in an anticipatory manner), initiating an output of the prompt information for permitting an automatic adaptation of the currently predefined permissible maximum speed to a new permissible maximum speed. When the driver acknowledges by a corresponding operating act the permission of the automatic adaptation of the permissible maximum speed, the function unit will then cause a corresponding adaptation. Subsequently depending in which direction the maximum speed was adapted—a higher speed or only still a lower speed than previously can be permitted. When, for example, before the adaptation of the maximum speed, a speed was requested, which previously had not been permitted because of the originally permitted maximum speed, the function unit can now—at least when the request is below the new permitted maximum speed—permit a correspondingly higher speed. If the originally permitted maximum speed was greater than the newly permitted maximum speed, the function unit can initiate a corresponding reduction of the actual speed, ideally such that—if still possible the new permitted maximum speed is no longer exceeded at the location of the relevant event. Should such an adaptation no longer be possible, because the location has already been passed, according to a predefined deceleration strategy, a braking to the new maximum speed could take place.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A longitudinally guiding driver assistance system of a motor vehicle being driven along a route, comprising:
   a first detection system that detects speed-change events, speed-change events being events ahead of the vehicle that lead to the longitudinally guiding driver assistance system changing a permissible maximum speed at which the motor vehicle is driven along the route;
   a second detection system that detects route information of the route along which the motor vehicle is being driven; and
   a function unit that, in response to the detection of a speed-change event:
   determines a new permissible maximum speed,
   determines a location-dependent point in time ahead of the vehicle from the determined new permissible maximum speed, the location of the speed change event, and the route information, and
   after reaching the determined location-dependent point in time:
   (a) outputs a prompt requesting authorization to change the permissible maximum speed to the new permissible maximum speed, and
   (b) changes the permissible maximum speed at which the motor vehicle is being driven along the route to the new permissible maximum speed so as to prevent an awkward speed change event.

2. The longitudinally guiding driver assistance system according to claim 1, wherein the function unit determines the location-dependent point in time based on the route information, which includes information concerning a currently traveled course of the route and/or a course of a route lying ahead.

3. The longitudinally guiding driver assistance system according to claim 1, wherein the function unit determines the location-dependent point in time based on the route information, which includes information concerning a course of a route situated behind the location of the speed-change event.

4. The longitudinally guiding driver assistance system according to claim 3, wherein the information concerning the route situated behind the location of the speed-change event includes the information concerning the route situated within a route interval starting at the location of the speed-change event.

5. The longitudinally guiding driver assistance system according to claim 1, wherein the function unit determines the location-dependent point in time based on the route information, which includes information concerning a recommended maximum speed of a route section of the route.

6. The longitudinally guiding driver assistance system according to claim 1, wherein the second detection system and/or the function unit determines information concerning a recommended maximum speed of a route section of the route.

7. The longitudinally guiding driver assistance system according to claim 1, wherein the function unit determines the location-dependent point in time based on the route information, which includes information concerning the route situated behind the speed-change event, and wherein if the detected speed-change event leads to changing the permissible maximum speed such that an acceleration of the motor vehicle is initiated.

8. The longitudinally guiding driver assistance system according to claim 1, wherein the detected speed-change event leads to accelerating the vehicle, and the function unit determines the location-dependent point in time as a function of a recommended maximum speed of a route section situated behind the detected speed-change event.

9. The longitudinally guiding driver assistance system according to claim 1,
wherein the detected speed-change event leads to accelerating the vehicle,
wherein a detected route section provides a lower recommended maximum speed than the maximum speed determined on the basis of the speed-change event, and
wherein the function unit determines the location-dependent point in time such that the automatic adaptation or the output of the prompt information is initiated only after passing the detected route section with the lower recommended maximum speed.

10. The longitudinally guiding driver assistance system according to claim 9, wherein the location-dependent point in time is only determined such that the change to the permissible maximum speed or the output of the prompt is initiated only after the passing of the detected route section with the lower recommended maximum speed if the speed-change event lies in front of or within the detected route section with the lower recommended speed.

* * * * *